United States Patent [19]

Bergquist et al.

[11] Patent Number: 5,194,461
[45] Date of Patent: Mar. 16, 1993

[54] STRUCTURAL MATERIALS FROM RECYCLED HIGH DENSITY POLYETHYLENE AND HERBACEOUS FIBERS, AND METHOD FOR PRODUCTION

[75] Inventors: Barton L. Bergquist; Mohammed F. Fahmy, both of Cedar Falls, Iowa

[73] Assignee: University of Northern Iowa Foundation, Cedar Falls, Iowa

[21] Appl. No.: 721,153

[22] Filed: Jun. 26, 1991

[51] Int. Cl.$^5$ .................. C08L 97/02; C08L 1/02; C08J 11/04
[52] U.S. Cl. .................. 524/13; 521/47; 524/9; 524/15; 524/16; 524/35
[58] Field of Search .............. 521/47; 524/9, 13, 15, 524/16, 35

[56] References Cited

U.S. PATENT DOCUMENTS

| | | | |
|---|---|---|---|
| 3,728,294 | 4/1973 | Levine | 524/13 |
| 4,144,304 | 3/1979 | Dereppe et al. | 524/13 |
| 4,717,743 | 1/1988 | Wakabayashi et al. | 524/13 |
| 4,833,181 | 5/1989 | Narukawa et al. | 524/13 |

FOREIGN PATENT DOCUMENTS

| | | | |
|---|---|---|---|
| 0496570 | 2/1978 | Australia | 521/47 |
| 0018897 | 7/1975 | Japan | 524/13 |
| 0020949 | 2/1976 | Japan | 524/13 |
| 0105433 | 6/1982 | Japan | 524/15 |
| 8810286 | 12/1988 | PCT Int'l Appl. | 524/9 |
| 2090849 | 7/1982 | United Kingdom | 524/9 |

*Primary Examiner*—Paul R. Michl
*Assistant Examiner*—Peter Skekely
*Attorney, Agent, or Firm*—Allan L. Harms

[57] ABSTRACT

A composite useful for structural components comprised of recycled high density polyethylene and herbaceous fibrous materials and a method to produce composites based on recycled high density polyethylene and chopped herbaceous fibers. An alternative structural composite is disclosed which is comprised of recycled low density polyethylene and chopped herbaceous fibrous material.

19 Claims, No Drawings

STRUCTURAL MATERIALS FROM RECYCLED HIGH DENSITY POLYETHYLENE AND HERBACEOUS FIBERS, AND METHOD FOR PRODUCTION

BACKGROUND OF THE INVENTION

The present invention relates to compositions based on polymers and fibrous filler materials and more particularly to the use of discarded high density polyethylene products and abundantly available agricultural products in combination to make structural components.

There are numerous references concerning wood/plastic combinations and the specific utility of incorporating wood fibers into polyethylene has been demonstrated. Moldable compositions based on combined plastic resins and fibrous plant materials are also known as shown in U.S. Pat. Nos. 4,203,876, 4,013,616, and 4,202,803. A product marketed under the trademark INTERFIBE TM is a specially prepared cellulosic material for combination with elastomeric materials for the preparation of paints and other coating materials. These references relate to the use of virgin resins in combination with vegetable fibers and do not direct their disclosures to the preparation of structural components from recycled high density polyethylene combined with herbaceous fibrous materials. U.S. Pat. No. 4,203,876 is directed to the required used of synthetic elastomers with thermoplastic polymers and lignocellosic materials to make sheets and panels of composite materials. U.S. Pat. No. 4,013,616 teaches the use of shredded front end components of a solid refuse system for use as filler in flowable thermoplastic materials to make cast resinous objects. The disclosure of U.S. Pat. No. 4,202,803 relates to the use of rice chaff incorporated in elastomers to manufacture vulcanized rubber.

The use of shredded post waste high density polyethylene for molding of structural components has been known wherein used milk jugs made from virgin high density polyethylene are granulated, then heated to a viscous state and extruded into boards and posts. The use of granulated recycled high density polyethylene in a transfer-compression molding process has also been employed to fabricate panel components. The use of herbaceous fibers with recycled high density polyethylene materials for molding into structural components, such as dimensioned structural members, is not envisioned in the prior art references.

SUMMARY OF THE INVENTION

According to the present invention, granulated high density polyethylene is blended with fibrous vegetative matter, preferably herbaceous fibers, for example, oat straw, chopped into suitably short lengths. The mixture is heated and passed into extrusion apparatus from which is drawn solidified composite materials which are formed into the shapes and dimensions of commonly used building materials, for example, dimensional lumber, namely studs, joists, planks, and boards. The extruded composite may be cut to desired length and can be nailed, glued, or screwed into position with other building components. A wood substitute for construction purposes is therefore provided.

It has been found that herbaceous fibers other than oat straw may be used, including corn stalks, and soybean straw, and that all these fibrous fillers improve the performance of thermoplastic polymers over the performance of such polymers having no fibrous filler, when such composites are formed into structural components. The proportion of fiber to polymer for preferred results for structural components is found to be in the approximate range of 10 percent to 40 percent by weight.

It has been further found that a homogenous mixture of chopped herbaceous fibers and granulated recycled high density polyethylene may be introduced into transfer molding means and formed therein into sheets or panels as a substitute for wood components.

It is an object of the invention to provide a suitable structural material from abundant materials available in the environment.

It is another object of the invention to provide a valuable composition product from recycled high density polyethylene products.

It is another object of the invention to provide a structural composite utilizing abundant raw materials of little value in their raw state.

It is a further object of the invention to provide a composite material with adequate rigidity and strength to be a substitute for lumber in construction uses.

These and other objects will become apparent from a review of the detailed description which follows.

DETAILED DESCRIPTION OF THE INVENTION

The present invention addresses the recycling of plastic milk jugs and other containers made from high density polyethylene polymers. It has been found that the incorporation of herbaceous fibers into a matrix of post-waste, high density polyethylene results in a composite which may be formed by known means into structural components useful in the building of structures. In particular, extrusion methods are used to form boards, joists, studs, and the like. Desirable building components can alternatively be prepared by transfer or compression molding in order to provide sheets of composite material.

In the preferred embodiment, post-waste high density polyethylene in the form of used milk jugs or other containers are granulated by mechanical means into small pellets or chips typically in the range of 0.25 inches to 0.5 inches in lateral dimensions. Herbaceous fibrous material, for example, agricultural plant segments such as oat straw, soybean straw or corn stalk fiber, which has been air dried, is chopped to small dimension, nominally 0.5 inches, though fibers of lengths from 0.001 inch to several inches in length may be used, and the resulting fiber is admixed in a suitable ratio by weight with the granulated high density polyethylene. The mixture of granular high density polyethylene and chopped herbaceous fibers may be passed through a preheating step to reduce moisture accumulated in the mixture. The mixture may then be heated to a flowable state and formed by extrusion into lengths of composite which may be cut into desired lengths for use as substitutes for dimensioned lumber products. Alternatively, the mixture may be heated in a transfer mold or a compression mold and formed into panels or sheets of selected dimensions.

It is found that a ratio of 10 percent to 40 percent by weight of chopped herbaceous fiber to granular post-waste high density polyethylene will produce a composite having preferred characteristics for use as a lumber substitute. It is further found that a structural component formed of the composite containing herbaceous fiber is superior in preferred characteristics to a structural component formed from a high density polyethylene matrix alone. In particular, the incorporation of herbaceous fiber in recycled high density polyethylene matrix produces a composite which experiences less dimensional post-extrusion shrinkage. The composite prepared under the method disclosed also experiences less porosity than a structural component formed from polymers without incorporation of herbaceous fiber.

In practice it has been learned that the incorporation of less that 10 percent by weight of herbaceous fiber within the post-waste plastic matrix contributes only marginally to hardness of the resulting composite and shrinkage of the extruded product is very little reduced by this level of fiber introduced into the matrix. It is also found that strength of the resulting components declines when a proportion of herbaceous fiber to high density polyethylene is increased above 40 percent by weight.

Herbaceous fibers of various species of plant are found to be useful, provided that the herbaceous material is susceptible to chopping and optimally contains little pith in the stem. Preferably, the herbaceous fiber will be plentiful and inexpensive such as segments from agriculturally grown plants. For example, it is found that oat straw, soybean straw, and corn stalk fiber are well suited for use in the plastic matrix, both due to the physical properties of each, and also due to the abundance of each in midwestern agricultural regions.

It is also been found that air drying of the fibrous material results in a suitably dessicated component for the matrix and that surfactants and other additives to the mixture are unnecessary (but may be desirable in certain applications). In contrast, many composite materials, such as wafer board or plywood, which are commonly used as structural building components, contain formaldehyde or volatile adhesives.

Scanning electron microscopy discloses that oat straw fibers are well anchored in the resulting plastic matrix, due to the microscopic projections which are found along the outer surface of the straw. Due to this anchoring feature, the oat fibers are more resistant to migration from the composite that other vegetative fibers which have been utilized as fillers for use in virgin polymeric matrices.

In an alternative embodiment of the invention, recycled low density polyethylene which has been granulated into pellets or chips is introduced into the mixture. Low density polyethylene is characterized by a lower melting temperature than high density polyethylene and the pellets or chips of low density polyethylene will fluidize more quickly than the granular high density polyethylene and will migrate among the high density polyethylene pellets and herbaceous fibrous elements to facilitate the moldability of the high density polyethylene pellets and eliminate or reduce voids or regions of incomplete fluidization of the high density polyethylene pellets.

In another alternative embodiment of the invention, recycled low density polyethylene which has been granulated into pellets or chips is intimately mixed with herbaceous fibrous material, for example, agricultural plant segments such as oat straw, soybean straw or corn stalk fiber, which has been air dried and chopped to small dimension. The mixture is preheated, then heated to a moldable state, and then shaped by well-known molding means, into useful components.

In order to illustrate the present invention, specific examples are hereinafter given. This is done by way of example and is not intended to limit the scope of the appended claims.

EXAMPLE 1

Agriculturally grown oat straw is first thoroughly air dried. Subsequently, it is reduced to shorter lengths by mechanical chopping into lengths of 0.5 inch or less. The fiber is maintained in a dry environment until processing into the plastic-fiber matrix.

The mixture is formulated by weight ratio of dry oat fiber to post-waste, high density polyethylene. Mixtures incorporating oat fiber material in variable amounts, as shown by the representative 10 percent, 20 percent, and 30 percent by weight, are mechanically mixed with pellets of previously used high density polyethylene plastic, until a homogeneous mixture is achieved. The plastic material and oat fiber material are both reduced to pieces of small dimension to facilitate a thorough mixing of the two materials.

The mixture is then formed into its desired shape by injection molding, according to the methods developed by Hammer's Plastic Recycling, Inc., Iowa Falls, Iowa. The method involves preheating of the mixture which facilitates further drying of the material, heating to a flowable state, and injection molding of the mixture at or above 220° C.

The injection molded products reflect added advantages, which are achieved by the addition of the oat fiber material. These advantages are demonstrated by impact testing using ASTM standard methods. The improved physical strength of the oat fiber-plastic matrix is shown by comparison to the plastic-only control. The impact test results at liquid nitrogen temperature ($-196°$ C.), room temperature ($27°$ C.), and elevated temperature ($49°$ C.) are shown as percent of the control in Tables 1-3.

TABLE 1

| Impact Testing Liquid Nitrogen Temperature ($-196°$ C.) | |
| --- | --- |
| % Fiber | % of Control |
| 10% | 200% |
| 20% | 282% |
| 30% | 257% |

TABLE 2

| Impact Testing Room Temperature ($27°$ C.) | |
| --- | --- |
| % Fiber | % of Control |
| 10% | 107% |
| 20% | 135% |
| 30% | 366% |

TABLE 3

| Impact Testing High Temperature ($49°$ C.) | |
| --- | --- |
| % Fiber | % of Control |
| 10% | 54% |
| 20% | 100% |
| 30% | 76% |

The advantage of fiber incorporation is also illustrated by the reduction in dimensional shrinkage afforded by fiber incorporation.

The control specimens reflect a smaller physical dimension, due to shrinkage after molding. Tables 4-6 illustrate the reduction in dimensional shrinkage, for three different dimensions, which occurs with the addition of the oat fiber material.

TABLE 4

Dimensional Changes
Dimension - Center Thickness

| % Fiber | % of Control |
|---|---|
| 10% | 92% |
| 20% | 106% |
| 30% | 115% |

TABLE 5

Dimensional Changes
Dimensional - Width

| % Fiber | % of Control |
|---|---|
| 10% | 98% |
| 20% | 106% |
| 30% | 100% |

TABLE 6

Dimensional Changes
Dimension - Length

| % Fiber | % of Control |
|---|---|
| 10% | 101% |
| 20% | 101% |

The hardness of the molded oat fiber-plastic matrix product is also modified by incorporation of the oat fiber. The penetration tests were performed using a low range nonmetallic uni-tester manufactured by Vega Enterprises, Inc. The penetration force varies relative to the "grain" of the material (there is a directional orientation of the fibers as they are incorporated into the matrix caused by the extrusion process); the benefit of higher fiber content is shown as a percentage of control in Table 7.

TABLE 7

Penetration Tests

| % Fiber | % of Control, With Grain | % of Control, Cross Grain |
|---|---|---|
| 10% | 97% | 109% |
| 20% | 93% | 88% |
| 30% | 110% | 150% |

The ability of the oat fiber-plastic matrix to retain nails, is also enhanced by oat fiber incorporation. Table 8 shows the increases in force (as percentage of the plastic-only control) needed to extract a six penny nail from a depth of 0.75 inches into the matrix.

TABLE 8

Nail Retention

| % Fiber | % of Control, With Grain | % of Control, Cross Grain |
|---|---|---|
| 10% | 100% | 188% |
| 20% | 150% | 263% |
| 30% | 200% | 200% |

When oat fiber is incorporated within the plastic matrix, there is also a marked decrease in flexure with a given load on the matrix. This is demonstrated in Table 9, where the flexure of an oat fiber-plastic matrix measuring 0.75 inch by 3 inches by 19.5 inches was determined over a 16-inch span, using a low range non-metallic uni-tester manufactured by Vega Enterprises, Inc., according to ASTM standard procedure DT10-81. The control is recycled high density polyethylene without herbaceous fiber incorporation.

TABLE 9

Flexure Testing
Flexure scale value versus load

| Load in lbs. | Control | FIBER CONTENT 10% | 20% |
|---|---|---|---|
| 0 | 0 | 0 | 0 |
| 10 | 0.078 | 0.016 | 0.034 |
| 20 | 0.13 | 0.049 | 0.05 |
| 30 | 0.143 | 0.07 | 0.072 |
| 40 | 0.23 | 0.11 | 0.094 |
| 50 | 0.273 | 0.132 | 0.112 |
| 60 | 0.3 | 0.184 | 0.152 |
| 70 | 0.368 | 0.234 | 0.177 |
| 80 | 0.403 | 0.289 | 0.196 |
| 90 | 0.493 | 0.329 | 0.234 |
| 100 | 0.548 | 0.376 | 0.268 |
| 110 | 0.62 | 0.419 | 0.296 |
| 120 | 0.672 | 0.464 | 0.317 |
| 130 | 0.748 | 0.514 | 0.367 |
| 140 | 0.863 | 0.566 | 0.402 |
| 150 | 0.908 | 0.632 | 0.47 |
| 160 | | 0.714 | 0.497 |
| 170 | | | 0.544 |
| 180 | | | 0.55 |
| 190 | | | 0.617 |
| 200 | | | 0.672 |
| 210 | | | 0.713 |
| 220 | | | 0.762 |
| 230 | | | 0.824 |
| 240 | | | 0.922 |
| 250 | | | 0.937 |

EXAMPLE 2

Agriculturally grown soybean straw is first thoroughly air dried. Subsequently, it is reduced to shorter lengths by mechanical chopping into lengths of 0.5 inch or less. The fiber is maintained in a dry environment until processing into the plastic-fiber matrix.

The mixture is formulated by weight ratio of dry soybean fiber to recycled high density polyethylene. Mixtures incorporating soybean fiber material in variable amounts, as shown by the representative 10 percent, 20 percent, and 30 percent by weight, are mechanically mixed with pellets of post waste high density polyethylene plastic, until a homogeneous mixture is achieved. The plastic material and soybean fiber material are both reduced to pieces of small dimension to facilitate a thorough mixing of the two materials.

The mixture is then formed into its desired shape by injection molding, according to the methods developed by Hammer's Plastic Recycling, Inc., Iowa Falls, Iowa. The method involves preheating of the mixture which facilitates further drying of the material, heating to a flowable state, and injection molding of the mixture at or above 220° C.

The injection molded products reflect added advantages, which are achieved by the addition of the soybean fiber material. These advantages are demonstrated by impact testing using ASTM standard methods. The improved physical strength of the soybean fiber-plastic matrix is shown by comparison to the plastic-only control. The impact test results at liquid nitrogen temperature (−196° C.), room temperature (27° C.), and elevated temperature (49° C.) are shown as percent of the control in Tables 10–12.

TABLE 10

Impact Testing
Liquid Nitrogen Temperature (−916° C.)

| % Fiber | % of Control |
|---|---|
| 10% | 423% |
| 20% | 418% |
| 30% | 431% |

TABLE 11

Impact Testing
Room Temperature (27° C.)

| % Fiber | % Control |
|---|---|
| 10% | 368% |
| 20% | 379% |
| 30% | 303% |

TABLE 12

Impact Testing
High Temperature (49° C.)

| % Fiber | % of Control |
|---|---|
| 10% | 107% |
| 20% | 94% |
| 30% | 88% |

The advantage of fiber incorporation is also illustrated by the reduction in dimensional shrinkage afforded by fiber incorporation. The control specimens reflect a smaller physical dimension, due to shrinkage after molding. Table 13 illustrates the reduction in dimensional shrinkage, for the center thickness dimension, which occurs with the addition of the fiber material.

TABLE 13

Dimension Change with Fiber Incorporation
Dimension - Center Thickness

| % Fiber | % of Control |
|---|---|
| 10% | 110% |
| 20% | 113% |
| 30% | 112% |

The hardness of the molded soybean fiber-plastic matrix product is also modified by incorporation of the soybean fiber. The penetration tests were performed using a low range nonmetallic uni-tester manufactured by Vega Enterprises, Inc. The penetration force varies relative to the "grain" of the material (there is a directional orientation of the fibers as they are incorporated into the matrix caused by the extrusion process); the benefit of higher fiber content is shown as percent of control in Table 14.

TABLE 14

Penetration Tests

| % Fiber | % of Control, With Grain | % of Control, Cross Grain |
|---|---|---|
| 10% | 103% | 153% |
| 20% | 89% | 173% |
| 30% | 115% | 79% |

The ability of the soybean fiber-plastic matrix to retain nails, is also enhanced by soybean fiber incorporation. Table 15 shows the increases in force (as a percentage of the plastic-only control) needed to extract a six penny nail from a depth of 0.75 inches into the matrix.

TABLE 15

Nail Retention

| % Fiber | % of Control, With Grain | % of Control, Cross Grain |
|---|---|---|
| 10% | 238% | 300% |
| 20% | 125% | 120% |
| 30% | 150% | 380% |

When soybean fiber is incorporated within the plastic matrix, there is also a marked decrease in flexure with a given load on the matrix. This is demonstrated in Table 16, where the flexure of a soybean fiber-plastic matrix measuring 0.75 inch by 3 inches by 19.5 inches was determined over a 16 inch span, using a low range nonmetallic uni-tester manufactured by Vega Enterprises, Inc., according to ASTM standard procedure DT10-81. The control is recycled high density polyethylene without herbaceous fiber incorporation.

TABLE 16

Flexure Testing
Flexure scale value versus load

| Load in lbs. | Control | 10% | 20% | 30% |
|---|---|---|---|---|
| 0 | 0 | 0 | 0 | 0 |
| 10 | 0.078 | 0.022 | 0.027 | 0.037 |
| 20 | 0.13 | 0.065 | 0.06 | 0.04 |
| 30 | 0.143 | 0.095 | 0.091 | 0.09 |
| 40 | 0.23 | 0.132 | 0.11 | 0.127 |
| 50 | 0.273 | 0.138 | 0.141 | 0.151 |
| 60 | 0.3 | 0.19 | 0.155 | 0.177 |
| 70 | 0.368 | 0.222 | 0.203 | 0.217 |
| 80 | 0.403 | 0.296 | 0.233 | 0.255 |
| 90 | 0.493 | 0.314 | 0.26 | 0.285 |
| 100 | 0.548 | 0.345 | 0.305 | 0.335 |
| 110 | 0.62 | 0.385 | 0.353 | 0.384 |
| 120 | 0.672 | 0.425 | 0.38 | 0.405 |
| 130 | 0.748 | 0.456 | 0.396 | 0.475 |
| 140 | 0.863 | 0.52 | 0.447 | 0.533 |
| 150 | 0.908 | 0.55 | 0.51 | 0.595 |
| 160 |  | 0.5 | 0.561 | 0.639 |
| 170 |  | 0.655 | 0.605 | 0.691 |
| 180 |  | 0.691 | 0.653 | 0.75 |
| 190 |  | 0.815 | 0.8 | 0.845 |
| 200 |  |  | 0.865 |  |
| 210 |  |  | 0.93 |  |

EXAMPLE 3

Agriculturally grown corn stalk fiber is first thoroughly air dried. Subsequently, it is reduced to shorter lengths by mechanical chopping into lengths of 0.5 inch or less. The fiber is maintained in a dry environment until processing into the plastic-fiber matrix.

The mixture is formulated by weight ratio of dry corn stalk fiber to high density polyethylene. Mixtures incorporating corn stalk fiber material in variable amounts, as shown by the representative 10 percent, 20 percent, 30 percent, and 40 percent by weight, are mechanically mixed with pellets of post waste high density polyethylene plastic, until a homogeneous mixture is achieved. The plastic material and corn stalk fiber material are both reduced to pieces of small dimension to facilitate a thorough mixing of the two materials.

The mixture is then formed into its desired shape by injection molding, according to the methods developed by Hammer's Plastic Recycling, Inc., Iowa Falls, Iowa. The method involves preheating of the mixture which facilitates further drying of the material, heating the mixture to a flowable state, and injection molding of the mixture at or above 220° C.

The injection molded products reflect added advantages, which are achieved by the addition of the corn stalk fiber material. These advantages are demonstrated by impact testing using ASTM standard methods. The improved physical strength of the corn stalk fiber-plastic matrix is shown by comparison to the plastic-only control. The impact test results at liquid nitrogen temperature (−196° C.), room temperature (27° C.), and elevated temperature (49° C.) are shown as percent of the control in Tables 17-19.

TABLE 17

Impact Testing
Liquid Nitrogen Temperature (−196° C.)

| % Fiber | % of Control |
|---|---|
| 10% | 346% |
| 20% | 351% |
| 30% | 483% |
| 40% | 297% |

TABLE 18

Impact Testing
Room Temperature (27° C.)

| % Fiber | % of Control |
|---|---|
| 10% | 333% |
| 20% | 298% |
| 30% | 231% |
| 40% | 207% |

TABLE 19

Impact Testing
High Temperature (49° C.)

| % Fiber | % of Control |
|---|---|
| 10% | 112% |
| 20% | 101% |
| 30% | 67% |
| 40% | 62% |

The advantage of fiber incorporation is also illustrated by the reduction in dimensional shrinkage afforded by fiber incorporation. The control specimens reflect a smaller physical dimension, due to shrinkage after molding. Table 20 illustrates the reduction in dimensional shrinkage, for the center thickness dimension, which occurs with the addition of the corn stalk fiber material.

TABLE 20

Dimensional Change with Fiber Incorporation
Dimension - Center Thickness

| % Fiber | % of Control |
|---|---|
| 10% | 111% |
| 20% | 112% |
| 30% | 110% |
| 40% | 104% |

The hardness of the molded corn stalk fiber-plastic matrix product is also modified by incorporation of the corn stalk fiber. The penetration tests were performed using a low range nonmetallic uni-tester manufactured by Vega Enterprises, Inc. The penetration force varies relative to the "grain" of the material (there is a directional orientation of the fibers as they are incorporated into the matrix caused by the extrusion process); the benefit of higher fiber content is shown as percent of control in Table 21.

TABLE 21

Penetration Tests

| % Fiber | % of Control, With Grain | % of Control, Cross Grain |
|---|---|---|
| 10% | 104% | 97% |
| 20% | 106% | 123% |
| 30% | 99% | 129% |
| 40% | 92% | 88% |

The ability of the corn stalk fiber-plastic matrix to retain nails, is also enhanced by corn stalk fiber incorporation. Table 22 shows the increases in force (as percentage of the plastic-only control) needed to extract a six penny nail from a depth of 0.75 inches into the matrix.

TABLE 22

Nail Retention

| % Fiber | % of Control, With Grain | % of Control, Cross Grain |
|---|---|---|
| 10% | 100% | 150% |
| 20% | 175% | 700% |
| 30% | 113% | 550% |
| 40% | 150% | 420% |

When corn stalk fiber is incorporated within the plastic matrix, there is also a marked decrease in flexure with a given load on the matrix. This is demonstrated in Table 23, where the flexure of a corn stalk fiber-plastic matrix measuring 0.75 inch by 3 inches by 19.5 inches was determined over a 16 inch span, using a low range non-metallic uni-tester manufactured by Vega Enterprises, Inc., according to ASTM standard procedure DT10-81. The control is recycled high density polyethylene without the herbaceous fiber incorporation.

TABLE 23

Flexure Testing
Flexure scale value versus load

| Load in lbs. | Control | 10% | 20% | 30% |
|---|---|---|---|---|
| 0 | 0 | 0 | 0 | 0 |
| 10 | 0.078 | 0.043 | 0.032 | 0.025 |
| 20 | 0.13 | 0.077 | 0.06 | 0.062 |
| 30 | 0.143 | 0.115 | 0.076 | 0.092 |
| 40 | 0.23 | 0.151 | 0.112 | 0.12 |
| 50 | 0.273 | 0.203 | 0.148 | 0.125 |
| 60 | 0.3 | 0.251 | 0.182 | 0.136 |
| 70 | 0.368 | 0.297 | 0.214 | 0.22 |
| 80 | 0.403 | 0.343 | 0.251 | 0.265 |
| 90 | 0.493 | 0.406 | 0.287 | 0.316 |
| 100 | 0.548 | 0.453 | 0.33 | 0.348 |
| 110 | 0.62 | 0.519 | 0.35 | 0.378 |
| 120 | 0.672 | 0.581 | 0.422 | 0.455 |
| 130 | 0.748 | 0.651 | 0.47 | 0.48 |
| 140 | 0.863 | 0.743 | 0.521 | 0.54 |
| 150 | 0.908 | 0.815 | 0.585 | 0.578 |
| 160 | | 0.849 | 0.615 | 0.594 |
| 170 | | | 0.681 | 0.65 |
| 180 | | | 0.702 | 0.735 |
| 190 | | | 0.78 | 0.815 |
| 200 | | | 0.9 | 0.868 |

EXAMPLE 4

Agriculturally grown fibers (e.g. oat straw, or soybean straw or corn stalk fiber, or other fiber products) are first thoroughly air dried. Subsequently, they are reduced to shorter lengths by mechanical chopping into lengths of 0.5 inch or less. The fiber is maintained in a dry environment until processing into the plastic-fiber matrix.

The mixture is preferably formulated by weight ratio of dry fiber to high density polyethylene. Mixtures incorporating fiber material in variable amounts are preferably mechanically mixed with pellets of post waste high density polyethylene plastic, until a homogeneous mixture is achieved. The plastic material and fiber material are both reduced to pieces of small dimension to facilitate a thorough mixing of the two materials.

The mixture would then preferably be heated to a flowable state and formed into a sheet (e.g. 48 inches by 48 inches by 0.5 inch) by transfer molding under compression, according to the methods developed by Iowa Plastics Incorporated, Sioux Center, Iowa.

The compression-transfer molded products will reflect added advantages, which are achieved by incorporation of the fiber products into the sheets. The incorporation of fibers causes stiffening of the matrix, strengthens the matrix upon impact, increases the force needed for penetration (hardness) and increases the force required to extract a nail from the matrix.

We claim:

1. A polymeric composition comprising an intimate mixture of chopped herbaceous fibers and granulated, previously-used high density polyethylene, heated to a moldable state and shaped into structural components, said herbaceous fibers being from the group consisting of oat straw, soybean straw and corn stalk fibers.

2. The composition of claim 1 wherein
the previously-used high density polyethylene is post waste containers.

3. The composition of claim 1 wherein
the herbaceous fibers are chopped to lengths of between 0.001 and 12 inches.

4. The composition of claim 1 wherein
the mixture is in the range of 10 percent to 40 percent by weight of herbaceous fibers to high density polyethylene.

5. Moldable composition comprising recycled high density polyethylene and chopped herbaceous fibers from the group consisting of oat straw, soybean straw and corn stalk fibers.

6. The composition of claim 5 wherein
the recycled high density polyethylene comprises shredded, used objects.

7. The composition of claim 5 wherein
recycled low density polyethylene is intermixed with the recycled high density polyethylene and the chopped herbaceous fibers.

8. The composition of claim 5 wherein
the herbaceous fibers are cut to lengths in the range of 0.001 to 12 inches.

9. The composition of claim 5 wherein
the herbaceous fibers are air dried.

10. The composition of claim 5 wherein
the herbaceous fibers comprise in the range of 10 percent to 40 percent by weight of the composition.

11. A process for forming structural components from filled polymeric composite including the steps of:
chopping herbaceous fibers into short lengths, the herbaceous fibers being from the group consisting of oat straw, soybean straw and corn stalk fibers.
chopping previously-used polyethylene materials into small chips,
intimately mixing the chopped herbaceous fibers and the chopped polyethylene chips,
heating the mixed fibers and polyethylene chips into a moldable state,
solidifying the moldable mixture into a composite building component.

12. The process of claim 11 wherein
the previously used polyethylene materials are high density polyethylene,
the moldable mixture is extruded to form structural building members.

13. The process of claim 11 wherein
the previously used polyethylene materials are high density polyethylene,
the moldable mixture is transfer molded under compression into sheets.

14. The process of claim 11 wherein
the previously used polyethylene materials are high density polyethylene,
chopped recycled low density polyethylene is intermixed with the recycled high density polyethylene and the chopped herbaceous fibers before heating.

15. The process of claim 4 wherein the previously used polyethylene materials are low density polyethylene.

16. A structural component of polymeric composition comprising
an intimate mixture of chopped, herbaceous segments from the group consisting of oat straw, soybean straw and corn stalk fibers, chopped into lengths in the range of 0.001 inch to 0.5 inch, and post waste containers molded of high density polyethelene which have been subdivided into granules of length in the range of 0.1 inch to 0.5 inch,
said chopped herbaceous fibers comprise in the range of ten percent to forty percent by weight of said intimate mixture,
said intimate mixture heated to a moldable state,
said mixture formed into structural components.

17. The structural component of claim 16 wherein
said post waste containers are blow molded containers,
said intimate mixture is preheated to a temperature below the temperature at which the polyethylene is flowable.

18. The structural component of claim 16 wherein
the intimate mixture is heated to at or above 220° C.

19. The structural component of claim 16 wherein
the herbaceous segments have microscopic projections therealong.

* * * * *